United States Patent [19]

Anderson

[11] 4,276,963
[45] Jul. 7, 1981

[54] SPREADING DISC BRAKES FOR VEHICLES

[75] Inventor: Robert A. Anderson, Birmingham, England

[73] Assignee: Lucas Industries Limited, Birmingham, England

[21] Appl. No.: 94,232

[22] Filed: Nov. 14, 1979

[30] Foreign Application Priority Data

Nov. 14, 1978 [GB] United Kingdom ............... 44327/78

[51] Int. Cl.³ ..................... F16D 55/16; F16D 55/18
[52] U.S. Cl. ................... 188/71.4; 188/71.8; 188/72.2; 188/196 P; 192/70; 192/111 A
[58] Field of Search ............... 188/106 F, 72.2, 71.4, 188/71.8, 196 P, 196 BA; 192/70, 111 A

[56] References Cited

U.S. PATENT DOCUMENTS

| | | | |
|---|---|---|---|
| 2,526,149 | 10/1950 | Myers et al. | 188/196 P |
| 2,607,442 | 8/1952 | Lucker et al. | 188/722 X |
| 2,796,153 | 6/1957 | Franzen | 188/71.4 |
| 2,799,366 | 7/1957 | Zindler | 188/196 BA X |
| 3,338,352 | 8/1967 | Guilhamat | 188/196 P |
| 3,343,632 | 9/1967 | Kershner et al. | 192/70 X |

FOREIGN PATENT DOCUMENTS

| | | | |
|---|---|---|---|
| 760973 | 6/1953 | Fed. Rep. of Germany | 188/196 P |
| 879211 | 6/1953 | Fed. Rep. of Germany | 188/71.4 |
| 2640092 | 3/1978 | Fed. Rep. of Germany | 188/71.4 |

*Primary Examiner*—George E. A. Halvosa
*Attorney, Agent, or Firm*—Scrivener, Clarke, Scrivener and Johnson

[57] ABSTRACT

In a disc brake of the spreading type an automatic adjuster is located within the housing of the brake. The adjuster comprises an extensible strut which acts between radial lugs on pressure plates to maintain the pressure plates in relative angular positions in which the braking clearances are maintained within the predetermined limits. In the construction described the strut is coupled at each end to a respective plate through a lever which is urged into a neutral position by a spring. The load in the spring is chosen to permit the lever to move angularly about a pivotal connection with its respective plate and prevent the effective length of the strut from being increased further as a result of loads which are transmitted through the strut as a consequence of structural deflection of the housing. The adjuster is therefore said to be "load-insensitive" for both directions of disc rotation.

5 Claims, 3 Drawing Figures

SPREADING DISC BRAKES FOR VEHICLES

SPECIFIC DESCRIPTION

This invention relates to improvements in self-energising spreading disc brakes of the kind in which rotatable friction discs provided with friction linings are adapted to be brought into engagement with spaced opposed radial surfaces in a housing by pressure plates located between the friction discs and centred by stationary pilot lugs. Balls or rollers are located in co-operating oppositely inclined recesses in the adjacent faces of the pressure plates and the application of the brake is initiated by moving the pressure plates apart into engagement with the radial surfaces. The pressure plates are carried round with the friction discs until one (arrested) pressure plate is arrested by the engagement of a lug on the plate with a drag-taking stop abutment in the housing and the continued angular movement of the other pressure (servo) plate provides a servo action to enhance the braking force by the balls tending to ride up ramps defined by the walls of the recesses.

Self-energising brakes of that kind may be "dry" or "oil-immersed" with the housing filled with oil. Such brakes are commonly used on tractors and like vehicles and hereinafter will be called brakes of the kind set forth.

It is desirable to provide disc brakes of the kind set forth with slack adjusters to compensate for wear of friction linings on the discs. Usually such slack adjusters are located outside the housing in a brake-applying mechanism and may operate automatically to maintain braking clearances within predetermined limits.

According to our invention in a disc brake of the kind set forth an automatic slack adjuster is located within the housing of the brake, and the adjuster comprises an extensible strut which is floatingly mounted within the housing and acts to maintain the pressure plates in relative angular positions in which the braking clearances are maintained within predetermined limits, the struts being extensible automatically when angular movement of the servo plate relative to the arrested plate in the application of the brake exceeds a predetermined value due to wear of the friction linings on the discs.

Since the strut is floatingly mounted it senses, and compensates for, excess relative separation of the plates, and not movement of either plate with respect to a relative fixed part, or relative movement between the plates in an axial direction in response to clamp loads.

When the brake is released, the angular distance through which the servo plate can move in the opposite direction relative to the arrested plate is reduced by a distance equal to the length by which the strut has extended. This, in turn, is effective to hold the plates in a spaced relationship which has been increased to compensate for wear of the linings since the balls are held further up the ramps defined by the walls of the recesses.

Preferably the strut is axially extensible and is coupled at opposite ends to lugs on the plates, the strut being extensible only in response to relative angular movement between the plates, and being unaffected by relative movement between the plates in an axial direction.

Conveniently the strut is coupled at opposite ends to lugs on the plates and the lugs are located on opposite sides of the drag-taking stop abutment, each lug comprising the lug on that plate which is engageable with the stop abutment in the application of the brake when that plate acts as the arrested plate.

Preferably the strut acts between the plate through at least one spring-loaded drag-force responsive member which is operative to preclude extension of the strut at a limit point when the drag-force between the arrested plate and the stop abutment exceeds the spring loading applied to the drag-force responsive member.

It follows therefore that at a relatively high drag no further adjustment is made, and the adjuster is therefore said to be "load-insensitive". That is to say the adjuster ignores the deflections of the brake components, for example the housing itself, which occur at the high forces and does not sense them as excess actuator travel for which adjustment is to be made. If the adjuster was not "load-insensitive", and therefore sensitive to clamp loads, there would be a tendancy for it to over-adjust in response deflections of the brake components.

In a preferred construction the strut is coupled at each end to a respective plate through a spring-loaded lever. This ensures that the adjuster is "load-insensitive" for both directions of disc rotation.

One embodiment of our invention is illustrated in the accompanying drawings in which.

Figure 1:
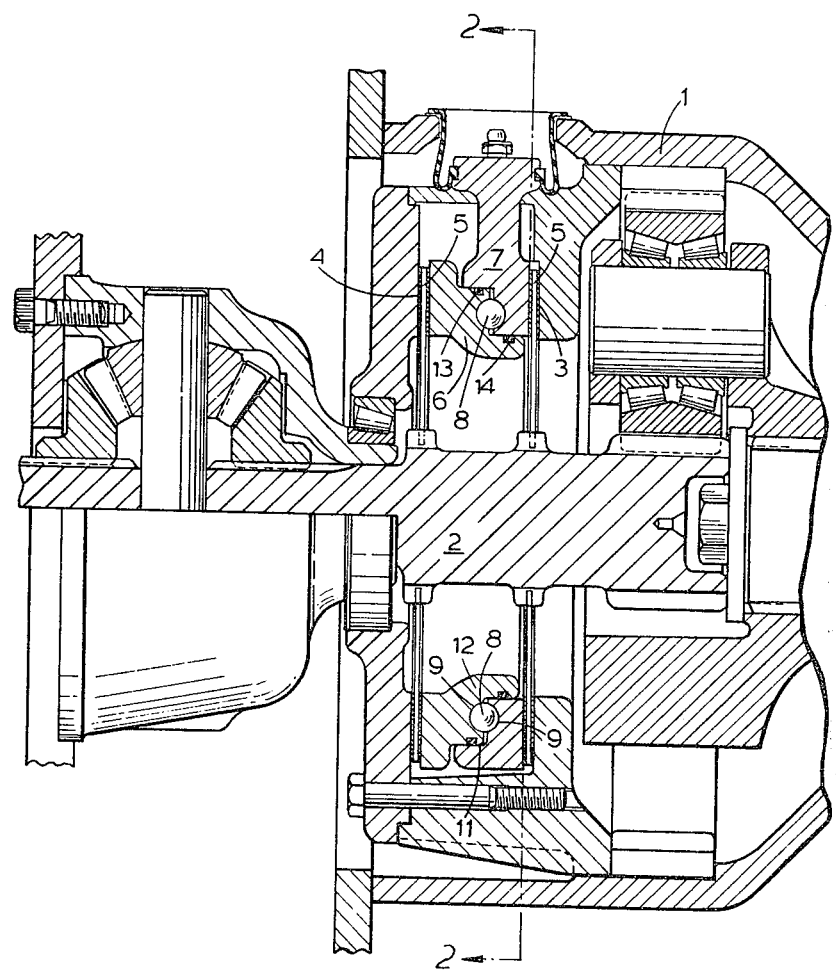
FIG. 1 is a longitudinal section through a disc brake of the spreading type substantially on the line 1—1 of FIG. 2.
Figure 2:
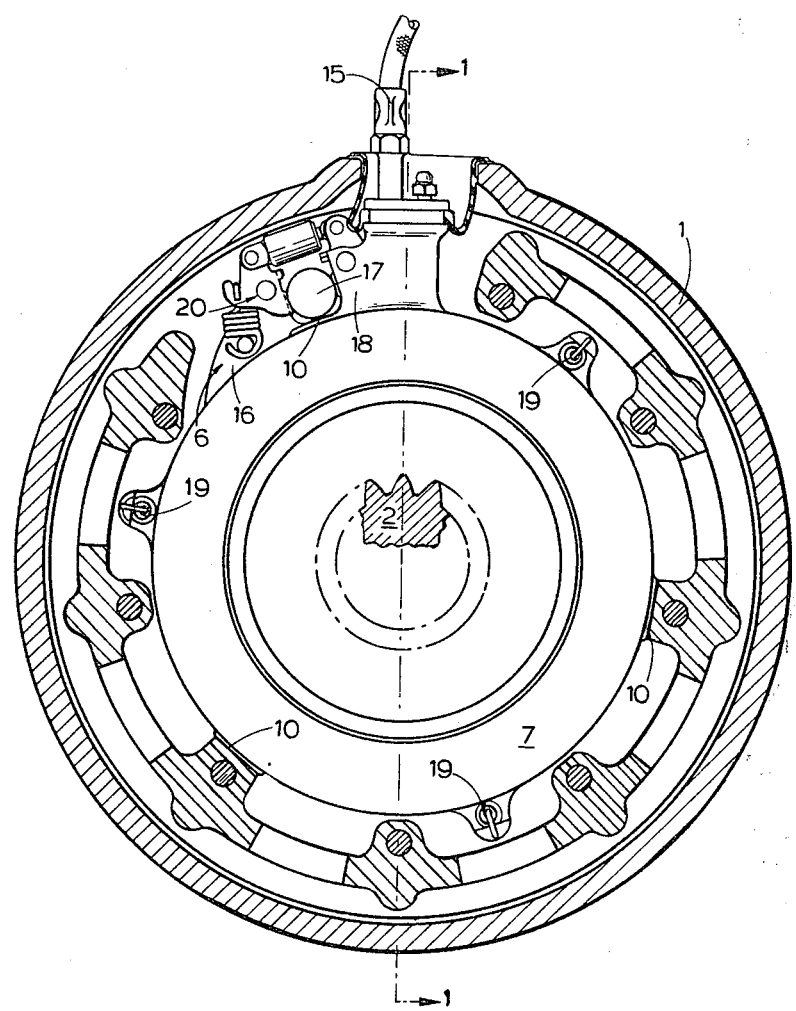
FIG. 2 is a section on the line 2—2 of FIG. 1.
Figure 3:
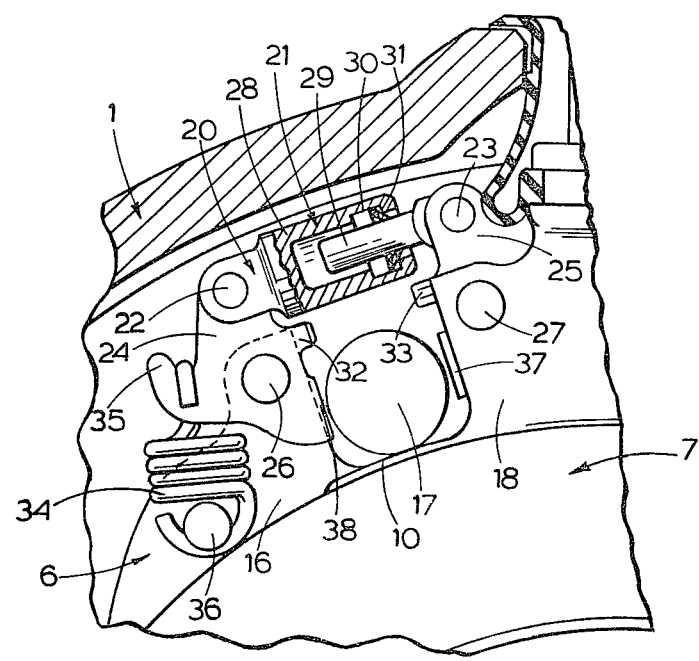
FIG. 3 is a portion of FIG. 2 on an enlarged scale.

The spreading brake illustrated in the drawings is adapted for braking a shaft for transmitting drive to a wheel of a vehicle. The brake comprises a housing 1 into which the shaft 2 extends, the housing having at opposite ends axially spaced radial braking surfaces 3,4 between which are located rotatable friction discs 5. The discs 5 are slidably keyed to the shaft 2.

An expander mechanism is located between the discs 5. The mechanism comprises two angularly movable pressure plates 6 and 7 in the form of rings which are located between the discs 5, and balls 8 located in oppositely inclined co-operating recesses 9 in adjacent faces of the plates 6,7. The plates are centred on angularly spaced pilots 10 in the housing 1.

The plate 7 is stepped inwardly of its peripheral edge to form a stepped wall comprising an annular hydraulic cylinder 11 in which works a complementary stepped portion on the other plate 6 comprising an integral annular piston 12. Annular seals 13 and 14 in the two faces of the piston 12 engage slidably with corresponding faces of the wall of the cylinder 11.

For normal service braking hydraulic fluid under pressure can be introduced into the cylinder 11 through a union 15 which comprises an extension of the wall of the plate 7. The pressure plates 6 and 7 are urged axially away from each other to clamp the friction discs 5 between the pressure plates 6 and 7 and the radial surfaces 3 and 4. The pressure plates 6 and 7 are then carried round with the discs 5 until one of the plates, for example the plate 6, is arrested by the engagement of a radial lug 16 on that plate with a pin 17 which acts as a stop abutment and also comprises one of the pilots 10. Continued angular movement of the other pressure plate 7, known as the servo plate, provides a servo action to intensify the braking force by the balls 8 tending to ride out of the recesses 9 to increase the force urging the plates 6,7 apart.

When the brake is applied with the discs rotating in the opposite direction the plate 7 will be arrested by the engagement of a radial lug 18 on that plate with substantially the diametrically opposite face of the pin 17, and the plate 6 is carried round to provide the servo action.

Angularly spaced compression return springs 19 act between the pressure plates 6 and 7 to urge them towards each other and into retracted positions at the termination of a brake application.

The brake incorporates an automatic slack adjuster 20. The slack adjuster comprises a two-part extensible strut 21 which is located within the housing 1 and is floatably mounted in the brake. The strut 21 is coupled by connections 22,23 to the free ends of a pair of levers 24,25 which, in turn, are connected by pivot pins 26,27 to the lugs 16 and 18 respectively.

The strut 21 comprises an outer member 28 which is coupled to the connection 22, and an inner member 29 which is received within the outer member 28. The outer member 28 is provided with a radial groove 30 between opposite ends of which is slidably movable a sprag ring 31 which is spragged to the inner member 29. The sprag ring 31 defines a one-way clutch which permits the inner member 29 to be relatively withdrawn from the outer member 28 in order to increase the effective length of the strut 21.

Each lever has a cranked stop abutment 32,33 respectively, which is normally urged into engagement with the outer end of the face of the lug 16,18 which is adjacent to the pin 17 by means of a pre-loaded tension spring 34 acting between an arm 35 on the lever 24,25 and an anchorage 36 on the plate 6. Only the spring 34 for the plate 6 is shown.

The connections 22,23 comprise loose fitting pin joints to permit relative movement between the plates 6 and 7 to take place in axial and circumferential directions.

The lost-motion distance through which the sprag ring 31 can move axially in the groove 30 without the inner member 29 moving relatively with respect to it defines the brake clearances.

When the brake is applied as described above the length of the strut increases.

When no adjustment is required the movement of the servo plate relative to the arrested plate will not exceed the distance required to take up the lost-motion corresponding to the brake clearances and through which the sprag ring 31 can move axially between opposite ends of the groove 30.

Should adjustment be required, initial movement of the servo plate takes up the brake clearances and subsequent movement, which is transmitted to the strut 21, is operative to extend the strut 21 with the inner member 29 sliding through the sprag ring 31. Upon release of the brake, the return springs 19 act to move the servo plate angularly in the opposite direction and the plates 6 and 7 axially towards each other with the balls 8 running back into the recesses. However this return movement is limited to the extent by which the strut 21 has extended and with the ring 31 abutting against the inner end of the groove 30. This has the result that the brake clearances are re-established within predetermined limits with the plates 6 and 7 spaced further apart by the balls 8 being held farther up ramps defined by the side walls of the recesses 9.

The strut 21 is not subjected to actuation loads and it acts to provide a back-stop against which the return springs 19 urge the two plates 6 and 7.

Should the drag-force between the lug of the arrested plate and the pin 17 exceed the pre-load in the respective one of the tension springs 34, according to the direction of rotation of the discs 5 the respective lever 24,25 carried by that lug will pivot about its pivot pin 26,27 and the respective stop abutment 32 and 33 will move away from its lug 16,18. Specifically, when the brake is applied with the discs rotating in a direction such that the plate 7 is to be arrested, this is achieved by the engagement of a projection 37 on the lever 25 with the pin 17 against the force in the spring 34 which holds the stop abutment 33 against the lug 18. When the abutment load between the lever 25 and the pin 17 is sufficient to overcome the load in the spring 34, the lever 25 will move angularly about the pivot pin 27 with the stop abutment 33 moving away from the lug 18, and the lug 18 moving towards, and engaging directly with, the pin 17. This movement of the lever 25 is in a direction to shorten the strut 21, so that the sprag ring 31 moves axially back along its groove 30 in the outer member 28. Further extension of the strut 21, due to deflections of the brake components as the brake forces build up, can thus take place without the sprag ring 31 reaching the end of the groove. It follows therefore that no further adjustment can occur.

When the discs are rotating in the opposite direction and when the brake is applied mechanically, a projection 38 on the lever 24 mounted on the plate 6 will engage with the pin 17 until the abutment load overcomes the force in the spring 34 which acts between the lever 24 and the anchorage 36.

The pre-load in each spring 34 is chosen to correspond to the drag-force which is high enough to ensure that all the slack in the actuation system has been taken up, but low enough to ensure that no significant deflections of the brake components, due to high braking forces, have yet occurred.

The adjuster is therefore load-insensitive in both directions of rotation of the discs 5.

After assembly the brake can be adjusted, simply by moving one of the plates 6,7 angularly with respect to the other plates to extend the strut 21 as described above to determine the desired brake running clearances.

In a modification the strut 20 comprises relatively rotatable members including a ratchet mechanism or a fast thread by means of which the effective length of the strut can be increased in response to a tensile force applied to it but which will withstand, without contracting, compression loads. In addition the threads, or the connections, or both include a degree of backlash or lost-motion corresponding to the brake clearances, namely the sum clearances between opposite faces of the discs 5, the braking surfaces 3,4 and the plates 6 and 7 when the brake is in an inoperative "off" position.

In the construction described above the adjuster 20 is load-insensitive in both directions of rotation of the discs and the adjuster 20 operates to maintain the braking clearances with pre-determined limits only when it senses excess drag and not in response to brake-applying clamp loads. That is to say the adjuster 20 operates only when relative movement between the plates 6, 7 takes place, in a circumferential direction, and no operation of the adjuster 20 take place when the plates 6, 7 are separated axially upon pressurisation of the cylinder 11. If this did not occur and the adjuster 20 was sensitive to brake-applying clamp loads and not to drag, then the adjuster would become "load sensitive" and would be liable to over-adjust in response to deflection of the housing 1 when the brake is applied. It follows therefore that no adjustment will occur when the brake is applied by the clamp action of the pressure plates 6 and 7, without utilising the effect of drag, for example when the vehicle is stationary.

I claim:

1. A self-energising spreading disc brake comprising a housing having opposed spaced radial surfaces, friction discs within said housing provided with friction linings for engagement with said radial surfaces, stationary pilot lugs in said housing, a servo pressure plate and an arrested pressure plate located between said friction discs, centred by said pilot lugs and relatively movable both axially and angularly, a stop abutment in said housing, said pressure plates having adjacent faces provided with co-operating oppositely inclined recesses, and balls or rollers located in said recesses, wherein said brake is initiated by moving said pressure plates in opposite directions into engagement with said friction discs which, in turn, are urged into engagement with said radial surfaces whereafter said pressure plates are carried round with said discs until said arrested pressure plate is arrested by said stop abutment and the continued angular movement of said servo-pressure plate provides a servo-action, and wherein an automatic slack adjuster is located within said housing, said adjuster comprises an extensible strut which is floatingly mounted within said housing and acts to maintain said pressure plates in relative angular positions in which braking clearances are maintained within predetermined limits, said strut being extensible automatically when angular movement of said servo plate relative to said arrested plate in the application of the brake exceeds a predetermined value due to wear of said friction linings, at least one spring-loaded member through which said strut acts between said pressure plates, said spring-loaded member being operative to preclude extension of said strut at a limit point when a drag-force between said arrested plate and said stop abutment exceeds the spring loading applied to said member, said member comprising a lever through which said strut is coupled to one of said plates, a pivotal connection between said lever and said plate, and a spring for urging said lever into a neutral position, the load in said spring being chosen to permit said lever to move angularly about said pivotal connection to prevent the effective length of said strut from being increased further at said limit point.

2. A self-energising spreading disc brake comprising a housing having opposed spaced radial surfaces, friction discs within said housing provided with friction linings for engagement with said radial surfaces, stationary pilot lugs in said housing, a servo-pressure plate and an arrested pressure plate located between said friction discs, centred by said pilot lugs and relatively movable both axially and angularly, a stop abutment in said housing, said pressure plates having adjacent forces provided with co-operating oppositely inclined recesses, and balls or rollers located in said recesses, wherein said brake is initiated by moving said pressure plates in opposite directions into engagement with said friction discs which, in turn, are urged into engagement with said radial surfaces whereafter said pressure plates are carried round with said discs until said arrested pressure plate is arrested by said stop abutment and the continued angular movement of said servo-pressure plate provides a servo-action, and wherein an automatic slack adjuster is located within said housing, said adjuster comprises an extensible strut which is floatingly mounted within said housing and acts to maintain said pressure plates in relative angular positions in which braking clearances are maintained within predetermined limits, said strut being extensible automatically when angular movement of said servo plate relative to said arrested plate in the application of the brake exceeds a predetermined value due to wear of said friction linings, spring-loaded members through which said strut acts between said pressure plates, said spring-loaded members, being operative to preclude extension of said strut at a limit point when a drag-force between said arrested plate and said stop abutment exceeds the spring loading applied to said members, each of said members, comprising a lever providing a coupling between each end of said strut and a respective plate, a pivotal connection being between each said lever and each said respective plate, and a spring for urging each said lever into a neutral position, the load in each said spring being chosen to permit said respective lever to move angularly about said pivotal connection and prevent the effective length of said strut from being increased further at said limit point.

3. A disc brake as claimed in claims 1 or 3 wherein said strut is axially extensible and is coupled at opposite ends to said plates, said strut being extensible only in response to relative angular movement between said plates, and being unaffected by relative movement between the plates in an axial direction.

4. A disc brake as claimed in claims 1 or 2, wherein each of said pressure plates is provided with a radial lug and said strut is coupled at opposite ends to said lugs on said plates, said lugs being located on opposite sides of said drag-taking stop abutment, and each said lug comprising a stop lug which is engageable with said stop abutment in the application of the brake when said plate provided with said stop lug acts as the arrested plate.

5. A disc brake as claimed in claims 1 or 2, wherein an hydraulic cylinder is defined between said pressure plates for operating said brake hydraulically by hydraulic fluid under pressure which is supplied to said cylinder, whereby the brake actuation load is supplied directly to said plates and said strut is freed from the brake actuation load at all times.

* * * * *